United States Patent [19]

Ewen et al.

[11] 4,296,212

[45] Oct. 20, 1981

[54] ELASTOMERIC POLYURETHANE-POLYUREA POLYMER PREPARED FROM AN ORGANIC POLYISOCYANATE A POLYOL AND AN AROMATIC DIAMINE HAVING AT LEAST ONE OF THE ORTHO POSITIONS TO EACH AMINE LOWER ALKYL

[75] Inventors: James H. Ewen; Thomas R. McClellan, both of Seabrook, Tex.

[73] Assignee: The Upjohn Company, Kalamazoo, Mich.

[21] Appl. No.: 181,720

[22] Filed: Aug. 27, 1980

[51] Int. Cl.$^3$ .............................................. C08G 18/14
[52] U.S. Cl. .................................... 521/163; 521/167; 528/75; 528/76; 528/77; 528/78; 528/80; 528/85
[58] Field of Search .................. 521/163, 167; 528/75, 528/76, 77, 78, 80, 85

[56] References Cited

U.S. PATENT DOCUMENTS

| | | | |
|---|---|---|---|
| 2,948,691 | 8/1960 | Windemuth et al. | 521/174 |
| 3,817,940 | 6/1974 | Blahak et al. | 521/128 |
| 4,048,105 | 9/1977 | Salisbury | 521/128 |
| 4,133,943 | 1/1979 | Blahak et al. | 521/163 |

FOREIGN PATENT DOCUMENTS 1534258 11/1978 United Kingdom.

*Primary Examiner*—Maurice J. Welsh
*Attorney, Agent, or Firm*—James S. Rose; Denis A. Firth

[57] ABSTRACT

Elastomeric polyurethane-polyurea polymers are disclosed that are derived from the reaction of organic polyisocyanates with A. primary hydroxyl polyols having a functionality of 2 to 4 and a molecular weight from 1500 to 12000, and B. extender mixtures comprised of 1. an aromatic diamine wherein at least one of the positions ortho to each amine group is substituted by a lower alkyl group, and 2. a lower molecular weight diol, provided that the aromatic diamine comprises from 5 to 45 percent by weight of the extender mixture and the balance comprises the diol.

The polymers find particular utility in the preparation of reaction injection molded parts, particularly, automotive parts because of their excellent flexural modulus, tensile, and tear properties.

11 Claims, No Drawings

ELASTOMERIC POLYURETHANE-POLYUREA POLYMER PREPARED FROM AN ORGANIC POLYISOCYANATE A POLYOL AND AN AROMATIC DIAMINE HAVING AT LEAST ONE OF THE ORTHO POSITIONS TO EACH AMINE LOWER ALKYL

BACKGROUND OF THE INVENTION

1. Field of the Invention

This invention relates to novel polyurethane polymers and is more particularly concerned with elastomeric polyurethane-polyurea polymers.

2. Description of the Prior Art

Polyurethane polymers and elastomers prepared from high molecular weight polyols and organic polyisocyanates and extended with low molecular weight polyols, particularly diols, have been known in the art for a long time; see U.S. Pat. No. 2,948,691, and Polyurethane Chemistry and Technology, Part II by J. H. Saunders and K. C. Frisch, Chapter IX, 1964, Interscience Publishers, New York, N.Y. for typical background art.

Polyurethane elastomer properties have been varied in numerous ways by adjusting such parameters as reactant functionality, type of isocyanate or polyol, and, very importantly, by adjusting the amount and the type of extender employed. If an organic polyamine is used as an extender then the resulting polymer will contain polyurea linkages along with the polyurethane.

In some applications, particularly cast elastomers, it is desirable to have slow acting systems. Contrastingly, with the advent of reaction injection molding (RIM) techniques it became desirable to have fast acting systems. Therefore, it is not surprising that there are many different aromatic diamines known in the art ranging typically from the slow methylenebis(o-chloroaniline), to the intermediate polymethylene polyphenylamine, to the very fast methylenebis(aniline). Many different types of substituent groups have been introduced into the aromatic ring to vary the reaction speed of the polymer forming process; see the art cited above.

When polyurethane-polyurea forming ingredients are deposited or otherwise injected into a mold cavity, it is essential that a careful balance of polymer gel time versus the molded part size be maintained. A fast enough gel time is necessary so that good polymer formation along with quick demold time is possible. At the same time, the gel cannot be so fast that polymer gelation is occurring on the mold walls or floor while ungelled reactants are still entering the mold. Accordingly, the polyurethane-polyurea polymer must have suitable reaction profiles which can be varied or adjusted to meet particular needs.

The use of polyamines including diamines and amines of functionality greater than two, as extenders in elastomeric polyurethanes, is well known in the art. For examples of the application of the latter type of extenders see U.S. Pat. Nos. 3,575,896 and 4,048,105. For examples of the application of diamines as extenders see U.S. Pat. Nos. 3,267,050, 3,428,610, 3,591,532, 3,681,290, 3,736,350, 3,794,621, 3,808,250, and 3,817,940; German Patent Application No. 2,635,400; and British Pat. Nos. 1,408,943, and 1,534,258.

The use of mixed extenders comprised of the polyamines with low molecular weight diols and triols has also been prevalent in the art. In this regard, note particularly the German Patent Application No. 2,635,400 and British Pat. No. 1,534,258.

Generally speaking, the use of polyamines as extenders gives rise to polymer products, particularly products molded with compact skins, that are characterized by excellent physical properties such as impact, tensile, modulus properties, and tear strengths in a given hardness range. At the same time, the use of unhindered polyamine extenders leads to reaction and processing times that are much faster than the reaction times of the diol extended polymers. The aromatic polyamines are generally preferred with the diamines being the most preferred types.

British Pat. No. 1,534,258 discloses the use of certain types of aromatic diamines as extenders including both unsubstituted and substituted amines with the latter being preferred in the RIM preparation of polyurethanepolyureas. The reference also discloses the use of extenders in which up to 50 percent by weight of the diamine is replaced by primary hydroxyl diol extenders. The disclosed polymers are characterized by very fast reaction profiles which can be too fast to fill large mold sizes before gelation begins to initiate. Attempts to continue injection of such polymer forming ingredients into a mold after gel results in poor polymer flow causing rapid and excessive tool pressure build-up and the potential for the rupture of the tool. Although an increase in the speed of mixing and delivery of the reaction ingredients into the mold can overcome some of these difficulties, there is a practical limit above which laminar flow will be upset. This will result in voids and unequal distribution of polymer in the mold.

We have now discovered that elastomeric polyurethanepolyurea polymers which are characterized, surprisingly, by good hardness, tear, and improved modulus properties and improved demold strengths compared to prior art aromatic diamine extended polyurethanes, can be prepared by using mixed aromatic aminediol extenders in which the diamine is the minor component. Surprisingly, the polymer-forming reactants have reaction profiles fast enough to be suitable for rapid molding and demolding processes, for example RIM applications, yet slow enough to enable the filling of large mold sizes before gelation can occur and thereby avoid the prior art problems noted above.

SUMMARY OF THE INVENTION

This invention comprises improved elastomeric polyurethane-polyurea polymers prepared by the catalyzed reaction of an organic polyisocyanate, a polyol and an extender mixture comprising an aromatic polyamine and a low molecular weight diol the improvement which comprises employing in said reaction, with said organic polyisocyanate A. a polyol having a primary hydroxyl functionality of from about 2 to about 4 and a molecular weight of from about 1500 to about 12,000, and B. an extender mixture comprising
  (i) an aromatic diamine wherein at least one of the positions ortho to each amino group of said diamine is substituted by a lower-alkyl group, and
  (ii) a low molecular weight diol, provided that said aromatic diamine comprises from about 5 to about 45 percent by weight of said mixed extender with the balance of from about 55 to about 95 percent by weight comprising the diol extender, and wherein the equivalent proportions of said polyol (A) to said extender mixture (B) is within the range of about 1:4 to about 1:50, and the ratio of isocyanate equivalents to the total active hydrogen equivalents of said polyol, said aromatic diamine, and said diol is from about 0.85 to about 1.35.

The term "aromatic diamine" means an aromatic diamine obtained by replacing two nuclear hydrogen atoms of an aromatic hydrocarbon by —NH₂ groups said aromatic hydrocarbon having from 6 to 12 aromatic carbon atoms, inclusive, and is inclusive of phenylene, tolylene, naphthylene, and aromatic diamines having the formula

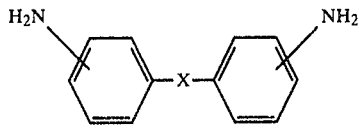

wherein X is selected from the group consisting of a single bond, —SO₂—,

—O—, and lower-alkylene from C₁ to C₄.

The term "lower-alkylene from C₁ to C₄" means alkylene having from 1 to 4 carbon atoms, inclusive, such as methylene, ethylene, propylene, butylene, and isomeric forms thereof.

The term "lower-alkyl" means alkyl having from 1 to 4 carbon atoms, inclusive, such as methyl, ethyl, propyl, butyl, and isomeric forms thereof.

The term "low molecular weight diol" means a diol falling within a molecular weight range of from about 60 to about 400, and is inclusive of alkylene glycols, oxyalkylene glycols, di(hydroxyalkylated)aromatic compounds, bis(hydroxyalkyl)ethers of dihydric phenols, and the like.

DETAILED DESCRIPTION OF THE INVENTION

The elastomeric polyurethane-polyurea polymers in accordance with the present invention can be prepared using any of the reaction techniques known in the art for the preparation of polyurethane polymers whether by hand mixing or machine mixing techniques; see the references cited supra for specific teaching on the preparation of polyurethanes, and particularly G.B. Pat. No. 1,534,258 for polyurethanes prepared by the reaction injection molding (RIM) technique.

The novelty in the present invention resides in the use of mixed extenders in reaction with a polyisocyanate and a high molecular weight polyol to form a polyurethanepolyurea polymer. The mixed extenders are comprised of a particular type of aromatic diamine and low molecular weight diol both defined above and used in specific proportions by weight to each other and in relation to the overall reactant mixture.

The relative proportions of polyol (A) defined above to extender mixture (B) defined above can vary over a wide range depending on specific molecular weights. Generally speaking, the equivalent proportions of polyol (A) to extender mixture (B) is within the range of about 1:4 to about 1:50, preferably 1:8 to 1:40.

The extender mixture (B) is advantageously comprised of from about 5 to about 45 percent by weight of the aromatic diamine component with the balance of from about 55 to about 95 percent by weight comprising the low molecular weight diol component. Preferably the aromatic diamine is from about 5 to about 40 percent by weight with the balance being the diol.

It will be understood by those skilled in the art that when the reference is made above to mixed extenders, or extender mixtures, this is not meant to imply that the aromatic diamine and diol must be prepared as a mixture prior to reaction with the polyisocyanate and polyol. The extender combination can be employed in any manner most convenient to the preparation of the polyurethanepolyurea at hand. That is to say, the ingredients can be preblended. Alternatively, they can be introduced individually into the reaction site to coreact with the polyisocyanate or polyisocyanate prepolymer component along with the polyol component.

When the aromatic diamines to be used in accordance with the present invention contain only one aromatic ring they can be any of the ortho-, meta-, and para-aromatic diamines meeting the above definition with the meta- and para-diamines being preferred. Generally speaking, the ortho diamines are difficult to obtain and to maintain in a pure form and are therefore not as preferred as the latter two types. The para diamines, while relatively easy to obtain are difficult to maintain in a pure state and therefore not as preferred as the meta diamines. Contrastingly, when the two amine groups are in separate aromatic rings the above relationships do not apply and generally speaking, any isomer arrangement of the amine group can be used.

In accordance with the present invention the aromatic diamine must have at least one of the ortho positions to each amino group substituted by a lower alkyl group otherwise the basicity of the aromatic amine is too strong causing the reaction with the polyisocyanate to proceed too rapidly. Preferably, all of the ortho positions to each amino group are substituted by a lower alkyl group.

It will be obvious to one skilled in the art that the preferred state of the aromatic diamine will be in the form of a liquid to facilitate the overall polymerization reaction. However, those aromatic diamines which are normally in the solid state under ambient room temperature conditions can be dissolved easily in the diol extender, or, alternatively, in the polyol component, or mixture of diol extender and polyol prior to reaction with the isocyanate component.

Illustrative, but not limiting, of the aromatic diamines used in accordance with the present invention are 1,3-dimethyl-2,4-diaminobenzene, 1,3-diethyl-2,4-diaminobenzene, 1,3-dimethyl-2,6-diaminobenzene, 1,4-diethyl-2,5-diaminobenzene, 1,4-diisopropyl-2,5-diaminobenzene, 1,4-dibutyl-2,5-diaminobenzene, 2,4-diaminomesitylene, 1,3,5-triethyl-2,4-diaminobenzene, 1,3,5-triisopropyl-2,4-diaminobenzene, 1-methyl-3,5-diethyl-2,4-diaminobenzene, 1-methyl-3,5-diethyl-2,6-diaminobenzene (and mixtures of the latter two diamines in varying proportions), and the like; 2,3-dimethyl-1,4-diaminonaphthalene, 2,6-dimethyl-1,5-diaminonaphthalene, 2,6-diisopropyl-1,5-diaminonaphthalene, 2,6-dibutyl-1,5-diaminonaphthalene, and the like; 3,3',5,5'-tetramethyl-benzidine, 3,3',5,5'-tetraisopropyl-benzidine, and the like; 3,3',5,5'-tetramethyl-4,4'-diaminodiphenylmethane, 3,3',5,5'-tetraethyl-4,4'-diaminodiphenylmethane, 3,3',5,5'-tetraisopropyl-4,4'-diaminodiphenylmethane, 3,3',5,5'-tetrabutyl-4,4'-diaminodiphenylmethane, 3,5-diethyl-3'-methyl-2',4-diaminodiphenylmethane, 3,5-diisopropyl-3'-methyl-2',4- diaminodiphenylmethane, 3,3'-diethyl-2,2'-diaminodiphenylmethane, and the like; 3,3',5,5'-tetraethyl-4,4'-diaminobenzophenone, 3,3',5,5'-tetraisopropyl-4,4'-diaminobenzophenone; 3,3',5,5'-tetraethyl-4,4'-diaminodiphenyl ether, 3,3',5,5'-tetraisopropyl-4,4'-diaminodiphenyl ether; 3,3',5,5'-tetraisopropyl-4,4'-diaminodiphenyl sulfone, and the like.

A preferred group of aromatic diamines is comprised of 1,3-diethyl-2,4-diaminobenzene, 2,4-diaminomesitylene, 1-methyl-3,5-diethyl-2,4-diaminobenzene, 1-methyl-3,5-diethyl-2,6-diaminobenzene, 3,3',5,5'-tetraisopropyl-4,4'-diaminodiphenylmethane.

A most preferred group is comprised of (a) 1-methyl-3,5-diethyl-2,4-diaminobenzene and 1-methyl-3,5-diethyl-2,6-diaminobenzene and mixtures of these in varying proportions, particularly the mixture comprising about 80 percent by weight of the 2,4-diamino isomer with 20 percent of the 2,6-isomer, and the mixture comprising about 65 percent by weight of the 2,4-isomer with about 35 percent of the 2,6-isomer, and (b) 3,3',5,5'-tetraisopropyl-4,4'-diaminodiphenylmethane.

The low molecular weight diols used in accordance with the present invention and defined above are well known to those skilled in the art as extender diols. Illustrative, but not limiting, are ethylene glycol, 1,3-propylene glycol, 1,2-propylene glycol, 1,4-butanediol, 1,2-hexanediol, neopentyl glycol, and the like; diethylene glycol, dipropylene glycol, and the like; and dihydroxyalkylated aromatic compounds such as the bis(2-hydroxyethyl)ethers of hydroquinone and resorcinol; p-xylene-α,α'-diol; the bis(2-hydroxyethyl)ether of p-xylene-α,α'-diol; m-xylene-α,α'-diol and the bis(2-hydroxyethyl)ether thereof.

A preferred group of extender diols comprises ethylene glycol and 1,4-butanediol.

The polyol component in accordance with the present invention and defined above can be any of the polyols well known to those skilled in the polyurethane art and which fall within the above definition. Primarily, the choice of polyol functionality and molecular weight will depend on the specific polymer properties required and the type of polyol employed. Generally speaking, the preferred functionality will be from about 2 to about 3 and the preferred molecular weight range of from about 2000 to about 8000, with a most preferred range of about 2000 to about 6000.

While the polyol has been defined hereinabove as containing primary hydroxyls this is not to imply that minor amounts of secondary hydroxyl groups cannot be present, either in the same molecule with the primary groups, or in a separate polyol component.

Illustrative, but not limiting, of the classes of polyols which can be used are the polyoxyalkylene polyethers; polyester polyols; polyol adducts derived from ethylene oxide with methylenedianiline and polymethylene polyphenylamine mixtures (in accordance with U.S. Pat. No. 3,499,009); polyols obtained by the Mannich condensation of a phenolic compound with formaldehyde, an alkanolamine, and ethylene oxide (in accordance with U.S. Pat. No. 3,297,597); vinyl reinforced polyether polyols, e.g. by the polymerization of styrene or acrylonitrile in the presence of the polyether; polyacetals prepared from glycols such as diethylene glycol and formaldehyde; polycarbonates, for example those derived from butanediol with diarylcarbonates; polyester amides; the resole polyols (see Prep. Methods of Polymer Chem. by W. R. Sorenson et al., 1961, page 293, Interscience Publishers, New York, N.Y.); and the polybutadiene resins having primary hydroxyl groups (see Poly Bd. Liquid Resins, Product Bulletin BD-3, October 1974, Arco Chemical Company, Div. of Atlantic Richfield, New York, N.Y.).

A preferred group of polyols comprises the propyleneoxy-polyethyleneoxy capped diols and triols obtained by the alkoxylation of water, ammonia, ethylene glycol, propylene glycol, trimethylolpropane, aniline, ethanolamine, and the like; the polyester diols obtained from the reaction of dibasic carboxylic acids such as succinic, adipic, suberic, azelaic, phthalic, isophthalic, and the like with alkylene glycols, and oxyalkylene glycols to form the corresponding polyalkylene, and polyoxyalkylene ester diols or copolymers thereof; and the vinyl-resin reinforced propyleneoxy-ethyleneoxy capped diols and triols, particularly those polyethers reinforced with polyacrylonitrile.

The polyisocyanates to be used in accordance with the present invention can be any of the organic di- or higher functionality polyisocyanates known to those skilled in the polyurethane art and may be aliphatic, cycloaliphatic, aromatic, or heterocyclic polyisocyanates such as those described by Siefken in Justus Liebigs Annalen der Chemie, 562, pages 75 to 136.

The preferred class of polyisocyanates are the aromatic polyisocyanates and the preferred isocyanate functionality of about 2. Most preferably, the polyisocyanates are aromatic isocyanates that are essentially diisocyanates which are in the liquid state at room temperature (circa 20° C.).

Typical of the polyisocyanates which can be used are hexamethylene diisocyanate, cyclohexane-1,4-diisocyanate, 3,3,5-trimethyl-5-isocyanatomethylcyclohexyl isocyanate, 1,4-methylenebis(cyclohexyl isocyanate), diphenylmethane diisocyanate, m- and p-phenylene diisocyanate, 2,4- and 2,6-toluene diisocyanate and the mixtures of these two isomers, triphenylmethane triisocyanates, 4,4'-diisocyanatodiphenyl ether; the various types of liquified 4,4'-methylenebis(phenylisocyanate) such as those disclosed in U.S. Pat. Nos. 3,384,653, 3,394,146, and 3,394,165 wherein storage stable liquid methylenebis(phenylisocyanates) are obtained by reacting said methylenebis(phenylisocyanates), including the 4,4'-isomer, the 2,4'-isomer, and mixtures of said 4,4'- and 2,4'-isomers in varying proportions with minor amounts of either a trihydrocarbyl phosphate, or dipropylene glycol, or N,N-di(2-hydroxypropyl)aniline respectively; a liquid prepolymer composition comprising the product obtained by bringing together a polymethylene polyphenylisocyanate containing from about 65 to about 85 percent by weight of methylenebis(phenylisocyanate) the remainder of said polymethylene polyphenylisocyanates having a functionality greater than 2 and from about 0.0185 to about 0.15 equivalent, per equivalent of said polyphenylisocyanate of a polyoxyethyleneglycol having an average molecular weight from about 200 to about 600 in accordance with U.S. Pat. No. 4,055,548; and the polymethylene polyphenyl polyisocyanates which are mixtures containing from about 20 to about 90 percent by weight of methylenebis(phenylisocyanate) the remainder of the mixture being polymethylene polyphenyl polyisocyanates of functionality higher than 2.0. Such polyisocyanates and methods for their preparation are well-known in the art; see, for example, U.S. Pat. Nos. 2,683,730, 2,950,263, 3,012,008 and 3,097,191. These polyisocyanates are also available in various modified forms. One such form comprises a polymethylene polyphenyl polyisocyanate as above which has been subjected to heat treatment, generally at temperatures from about 150° C. to about 300° C., until the viscosity (at 25° C.) has been increased to a value within the range of about 800 to 1500 centipoises. Another modified polymethylene polyphenyl polyisocyanate is one which has been treated with minor amounts of an epoxide to reduce the acidity thereof in accordance with U.S. Pat. No. 3,793,362.

Particularly preferred are the liquid diisocyanates comprising the carbodiimide-containing methylenebis(phenylisocyanates) having an isocyanate equivalent weight of from about 130 to about 180 in accordance with U.S. Pat. No. 3,384,653, and the liquid diisocyanates obtained from 4,4'-methylenebis(phenylisocyanate) and dipropylene glycol in accordance with the U.S. Pat. No. 3,394,146.

The proportions of polyisocyanate to the total active hydrogen equivalents comprised of the polyol, and the mixed extender of aromatic diamine plus extender diol are such that the ratio of isocyanate equivalents to the total active hydrogen equivalents falls within a range of from about 0.85 to about 1.35, preferably from about 0.97 to about 1.3, and most preferably from about 0.98 to about 1.2.

Any of the catalysts conventionally employed in the art to catalyze the reaction of an isocyanate with a reactive hydrogen containing compound can be employed for this purpose; see, for example, Saunders et al., Polyurethanes, Chemistry and Technology, Part I, Interscience, New York, 1963, pages 228-232; see also, Britain et al., J. Applied Polymer Science, 4, 207-211, 1960. Such catalysts include organic and inorganic acid salts of, and organometallic derivatives of, bismuth, lead, tin, iron, antimony, uranium, cadmium, cobalt, thorium, aluminum, mercury, zinc, nickel, cerium, molybdenum, vanadium, copper, manganese and zirconium, as well as phosphines and tertiary organic amines. Representative organotin catalysts are stannous octoate, stannous oleate, dibut-yltin diacetate, dibutyltin dioctoate, dibutyltin dilaurate, dibutyltin maleate, dibutyltin mercaptopropionate, dibutyltin didodecylmercaptide, dibutyltin bis(isoctylthioglycolate), and the like. Representative tertiary organic amine catalysts are triethylamine, triethylenediamine, N,N,N',N'-tetramethylethylenediamine, N,N,N',N'-tetraethylethylenediamine, N-methylmorpholine, N-ethylmorpholine, N,N,N',N'-tetramethylguanidine, N,N,N',N'-tetramethyl-1,3-butanediamine, N,N-dimethylethanolamine, N,N-diethylethanolamine, N,N-dimethylcyclohexylamine, and the like, and mixtures of the above in any combination.

The preferred catalysts are the organo metallic compounds and particularly the dialkyl tin salts such as the dibutyltin compounds noted above.

The amount of catalyst employed will vary considerably according to the particular extender mixtures in the polymer forming mixture and the particular catalyst involved. Optimum catalyst concentration is easily determined using trial and error tests by one skilled in the art. Generally speaking, the catalyst or mixture of catalysts will be employed within a range of from about 0.01 percent by weight to about 5.0 percent by weight, preferably from about 0.02 to about 3.0 percent, based on the total weight of isocyanate, polyol and extender mixture.

Optionally, blowing agents may be employed even in the production of molded polyurethane-polyureas wherein compact tough skinned surfaces are desired. Any of the blowing agents known to those skilled in the art can be used including water and the fluorocarbon blowing agents. The latter are preferred and generally are halogenated aliphatic hydrocarbons which can be also substituted by chlorine and/or bromine in addition to the fluorine content; see U.S. Pat. No. 3,745,133, column 11, lines 25 to 38 which disclosure relating to fluorocarbon blowing agents is incorporated by reference herein.

Also, inert gases (e.g. nitrogen) may be introduced at the polymer forming stage to provide whatever degree of blowing is desired from micro-cellular to macrocellular in nature.

Other optional additives such as dispersing agents, cell stabilizers, surfactants, flame retardants, colorants, and the like can be added to the polyurethane-polyurea polymers in accordance with the present invention.

Although the polyurethane-polyureas in accordance with the present invention can be prepared in the absence of any mechanical restraints (i.e. molds), it is in the preparation of molded polymers, particularly RIM applications wherein the most unique and unexpected properties of the present polymers reside. The polymers in accordance with the present invention provide reaction profiles, or times, fast enough to satisfy the profiles required for RIM reaction capabilities, yet slow enough to allow the filling of large molded parts before polymer gelation initiates. This capability was not possible with the art cited supra.

Further, and more surprising, the polymers produced in accordance with the present invention are characterized by the excellent properties of impact strength, tensile, hardness, heat resistance, modulus properties, and tear strength (all properties which are characteristic of high polyurea content), and, generally speaking, are superior to the prior art including improved demold strength.

Accordingly, the molded polyurethane-polyurea articles in accordance with the present invention find particular utility as auto parts such as car bumpers, body elements, panels, doors, engine hoods, skirts, air scoops, and the like. Further, the thermosetting nature of the present polymers results in their good high temperature performance characteristics which make them suitable for industrial elastomer applications where high temperature resistance is needed.

The following examples describe the manner and process of making and using the invention and set forth the best mode contemplated by the inventors of carrying out the invention but are not to be construed as limiting.

EXAMPLE 1

The following polyurethane-polyureas were prepared by reacting the ingredients in the proportions of parts by weight set forth in Table I, as an A component with a B component, in an Admiral 2000 HP RIM Machine capable of delivering about 250 lbs. per minute of reactant (Admiral Equipment Corp., Akron, Ohio, a division of The Upjohn Company, Kalamazoo, Mich.). Each component was pumped to the high pressure head through a metering head via high pressure impingement pumps (1200 to 3000 psi) to be atomized together in the head and shot into a mold. Low pressure (50 to 200 psi) recirculation pumps recirculated the components back to the A and B holding tanks between shots.

The mold was stainless steel and measured 20"×38"×0.125" and was capable of receiving a shot of about 4 lbs. The mold and the A and B components were maintained at the temperatures noted in Table I.

The polymer product was held in the mold for a certain period and subjected to a curing cycle after being demolded. The resulting plaques were then subjected to the physical tests set forth in Table I.

Plaques A, B, and C are in accordance with the present invention while D is in accordance with G.B. Pat. No. 1,534,258. The weight percent proportions of aromatic diamine to diol extender are 10/90, 30/70, and 40/60 in A, B, and C respectively, whereas in the case of D the extender is 100 percent aromatic diamine. Plaque D with a gel time of 1.8 second shows that the formulation with the 100 percent diamine could not be used to fill a mold with a shot size any greater than about 12 lbs. (11.88 lbs.), when utilizing the full capacity of present day RIM production machinery (about 400 lbs. per minute), before gelation would begin to initiate within the mold. To accommodate the more rapid gel time of D to part sizes larger than 12 lbs., before gelation begins, would require a delivery capacity beyond that which is generally available in RIM machines.

Contrastingly, the formulations of A to C could accommodate maximum part sizes ranging from about 33 lbs. to about 20 lbs. without gelation occurring before the mold is filled. At the same time, the properties of the polymers of A to C are, generally speaking, superior to those of D, particularly in regard to tensile and flexural modulus value. Plaques A to C had better demold strengths than plaque D which is reflected in the shorter demold times for the A to C samples.

TABLE I

| Plaque | A | B | C | D |
|---|---|---|---|---|
| Ingredients (pts. by wt.) | | | | |
| A component: | | | | |
| Polyisocyanate I[1] | 77.95 | 77.96 | 77.8 | 55.8 |
| B component: | | | | |
| SF 6503[2] | 100 | 100 | 100 | 100 |
| DETDA[3] | 1.63 | 5.69 | 8.24 | 22.23 |
| Ethylene glycol | 14.69 | 13.28 | 12.36 | — |
| UL-28[4] | 0.22 | 0.08 | 0.22 | 0.065 |
| NCO/OH Index | 1.04 | 1.05 | 1.05 | 1.03 |
| A/B, Temp.(°F.) | 94/130 | 93/132 | 93/132 | — |
| Mold temp.(°F.) | 180 | 180 | 210 | — |
| Gel time, (sec.) | 5 | 4 | 3 | 1.8 |
| Demold time (min.) | 1 | 1 | 1 | 2 |
| Post cure, °F./min. | 150/60 | 250/30 | 250/60 | 250/60 |
| Density, gm./cc. | — | 1.00 | 1.11 | 1.08 |
| Hardness, Shore A/D | 46D | 50D | 56D | 50D |
| Tensile str., psi | 3000 | 3300 | 4200 | 2900 |
| Elongation @ break, % | 230 | 220 | 260 | 370 |
| Tensile modulus, (psi) | | | | |
| 100% | — | 2500 | 2600 | 1400 |
| 200% | — | 3300 | 3500 | 1950 |
| 300% | — | — | — | 2650 |
| Die C Tear, pli[5] | — | 530 | 650 | 530 |
| Heat sag:[6] (in.) | | | | |
| 150° F. | — | — | — | — |
| 250° F. | 0.0 | — | — | — |
| 325° F. | 2.5 | 0.8 | 0.7 | — |
| Flexural Modulus, psi[7] | | | | |
| −20° F. | — | 55,742 | 73,000 | 62,605 |
| 75° F. | 16,029 | 21,870 | 32,452 | 22,736 |
| 158° F. | — | 13,056 | 21,201 | 12,086 |
| Izod Impact[8] | 6.0 | 6.5 | 7.8 | — |
| (ft.-lb./inch of notch) | | | | |

Footnotes to Table I
[1] Polyisocyanate I is a liquid carbodiimide-containing methylenebis(phenylisocyanate) prepared in accordance with U.S. Pat. No. 3,384,653; I.E. = 144.4.
[2] SF 6503 is a 6000 M.W. polypropyleneoxy-polyethyleneoxy triol, OH E.W. = 2100, (supplied by Jefferson Chemical Co.).
[3] DETDA is an 80/20 percent by weight mixture of 1-methyl-3,5-diethyl-2,4-diaminobenzene and 1-methyl-3,5-diethyl-2,6-diaminobenzene respectively.
[4] UL-28 is a dimethyl tin dialcoholate supplied by Witco Chemical Corp., Park Ave., New York, N.Y.
[5] Die C Tear is performed in accordance with ASTM Test Method C273.
[6] Heat sag is determined in accordance with Test CTZZZ006AA of the Chevrolet Div. of General Motors Corp., Flint, Mich., and is the sample sag in inches when exposed to the specified temperatures for 60 minutes unless a different time is noted.
[7] Flexural modulus is determined in accordance with ASTM Test Method D-790.
[8] Izod Impact is determined in accordance with ASTM Test Method D-256-56.

EXAMPLE 2

Using the procedure and apparatus described in Example 1 and the ingredients in the proportions by weight set forth in Table II, there were prepared the polyurethane-polyureas E, F, and G in accordance with the present invention and the polyurethane-polyurea H not so in accordance.

The high molecular weight polyol employed in E, F, and G was an acrylonitrile reinforced polypropyleneoxy-polyethyleneoxy triol. A similar polyol was employed in H but of slightly lower molecular weight.

Similarly to Example 1 formulation D, the gel time for H is far too fast to allow the filling of any relatively large molded parts whereas E, F, and G with the slower gel times are not so restricted. The physical properties of E, F, and G were found to be, generally speaking, superior to those of H. However, the times were still fast enough to allow processing with RIM Molding Techniques.

TABLE II

| Plaque | E | F | G | H |
|---|---|---|---|---|
| Ingredients (pts. by wt.) | | | | |
| A component: | | | | |
| Polyisocyanate I | 77.3 | 77.3 | 77.2 | 43.15 |
| B component: | | | | |
| Niax ® 38-23[1] | 100 | 100 | 100 | — |
| Niax ® 31-23[2] | — | — | — | 100 |
| DETDA | 1.63 | 5.69 | 8.24 | 22 |
| Ethylene glycol | 14.69 | 13.28 | 12.36 | — |
| UL-28 | 0.08 | 0.15 | 0.08 | 0.15 |
| NCO/OH Index | 1.05 | 1.05 | 1.05 | 1.04 |
| A/B Temp. (°F.) | 92/130 | 92/130 | 92/130 | — |
| Mold temp. (°F.) | 180 | 180 | 210 | — |
| Gel time, (sec.) | 5 | 4 | 3.5 | 1.8 |
| Demold time (min.) | 1 | 1 | 1 | — |
| Post cure, °F./min. | 250/90 | 350/60 | 350/60 | — |
| Density | 1.072 | 1.121 | 1.118 | 1.07 |
| Hardness, Shore D | 56D | 62D | 63D | 56D |
| Tensile str., psi | 3600 | 4650 | 5000 | 3625 |
| Elongation @ break, % | 230 | 210 | 210 | 310 |
| Tensile modulus, (psi) | | | | |
| 100% | 2450 | 3400 | 4350 | 2575 |
| 200% | 3200 | 4500 | 4700 | 3100 |
| 300% | — | — | — | 3550 |
| Die C Tear, pli | 540 | 825 | 800 | 510 |
| Heat sag, 325° F. (in.) | 0.7 | 0.7 | 0.5 | 0.3 |
| Flexural modulus, psi | | | | |
| −20° F. | 117.647 | 109,000 | 101,449 | 71,568 |
| 75° F. | 34,956 | 49,587 | 53,540 | 41,058 |
| 158° F. | 19,231 | 24,661 | 20,883 | 26,087 |
| Izod Impact | 8.0 | 12.0 | 10.6 | — |

TABLE II-continued

| Plaque | E | F | G | H |
|---|---|---|---|---|
| (ft.-lb./inch of notch) | | | | |

Footnotes to Table II
[1]Niax ® 38-23 is a polyproplyleneoxy-polyethyleneoxy triol having 50 percent by weight ethylene oxide content and reinforced with 20 percent by weight polyacrylonitrile; OH E.W. = 2328.
[2]Niax ® 31-23 is also a polypropyleneoxy-polyethyleneoxy triol with 20 percent by weight reinforcing polyacrylonitrile; OH E.W. = 2400. Both Niax ® 38-23 and 31-23 are supplied by Union Carbide Corp., 270 Park Ave., New York, N.Y.

EXAMPLE 3

Using the procedure and apparatus described in Example 1 and the ingredients in the proportions by weight set forth in Table III, there was prepared the polyurethane-polyurea I in accordance with the present invention while the polyurethane-polyureas J through N were in accordance with G.B. Pat. No. 1,534,258. Sample I contained the diamine and diol at 7.2 and 92.8 weight percent respectively of the extender mixture.

Samples J through N employed the diamine extender at varying levels. All three samples of J to L with the same polyol component were inferior to sample I in respect of hardness, modulus properties, and tear strength and demold time.

Samples M and N, employing different polyol components but with increased aromatic diamine, were still deficient in regard to modulus properties and demold times.

weight set forth in Table IV, there was prepared the polyurethane-polyurea O in accordance with the present invention while the polyurethane-polyureas P through S were in accordance with the teachings of the British patent cited supra. Sample O contained the diamine and diol at 44.2 and 55.8 weight percent respectively of the extender mixture.

Samples O, P and R can be fairly compared to each other as they all employ the same isocyanate, polyol, diamine and index. Sample O, as previously noted contains the diamine/glycol in the respective proportions of 44.2 and 55.8 weight percent; sample P is 100 percent diamine, and R is virtually 50/50 weight percent diamine/diol. All of the properties for sample O set forth in Table IV are superior to those properties for P and R.

A change in polyol component in sample Q did not improve the polymer properties over sample O. Likewise, a change to another diisocyanate in sample S, with the diamine/diol still at the 50/50 weight percent proportions, while leading to improved properties over samples P through R in regard to modulus and tear properties, resulted in properties still generally inferior to those of sample O.

TABLE III

| Plaque | I | J | K | L | M | N |
|---|---|---|---|---|---|---|
| Ingredients (pts. by wt.) | | | | | | |
| A component: | | | | | | |
| Polyisocyanate I | 79.7 | 21.5 | 19.9 | 18.27 | 47.42 | 41.2 |
| B component: | | | | | | |
| W 112[1] | 100 | — | — | — | — | — |
| SF 6503 | — | 100 | 100 | 100 | — | — |
| S-1040[2] | — | — | — | — | 100 | — |
| V-7[3] | — | — | — | — | — | 100 |
| DETDA | 1.16 | 9 | 8 | 7 | 20 | 20 |
| Ethylene glycol | 14.94 | — | — | — | — | — |
| Dabco 33LV[4] | 3.0 | — | — | — | — | — |
| UL-28 | — | 0.14 | 0.14 | 0.14 | 0.12 | 0.065 |
| NCO/OH Index | 1.02 | 1.02 | 1.02 | 1.01 | 1.02 | 1.03 |
| Mold temp. (°F.) | 160 | 140 | 150 | 160 | 156 | 160 |
| A/B Temp. (°F.) | 93/118 | 95/114 | 95/114 | 97/120 | 100/124 | 96/119 |
| Gel time (sec.) | 3 | 4 | 4 | 4.5 | 4 | 5 |
| Demold time (min.) | 0.5 | 1.5 | 1 | 1 | 1 | 1 |
| Post cure °F./min. | 250/60 | 250/60 | 250/60 | 250/60 | 250/60 | 250/60 |
| Density, gm./cc. | 1.135 | 1.041 | 1.032 | 1.04 | 1.149 | — |
| Hardness, Shore A/D | 61D | 71A | 71A | 58A | 52D | 52D |
| Tensile str., psi | 4200 | 4350 | 1300 | 1040 | 5250 | 2600 |
| Tensile modulus, psi | | | | | | |
| 100% | 3600 | 1100 | 400 | 220 | 1700 | 1300 |
| 200% | — | — | — | — | 2250 | 1900 |
| 300% | — | 2200 | 840 | 490 | 3450 | — |
| Die C Tear, pli | 650 | 290 | 220 | 175 | 650 | 480 |
| Flexural Modulus, psi | | | | | | |
| −20° F. | — | — | — | — | 72,076 | — |
| 75° F. | 54,522 | — | — | — | 20,061 | — |
| 158° F. | — | — | — | — | 12,943 | — |

Footnotes to Table III
[1]W 112 is a polypropyleneoxy-polyethyleneoxy triol reinforced with 20 percent by weight of polyacrylonitrile; OH E.W. = 2004, supplied by Union Carbide.
[2]S-1040 is a 50/50 weight percent copolymer of ethylene butylene adipate polyester diol of OH E.W. = 1000, supplied by Hooker Chem. Corp., Ruco Div., Hicksville, L.I.
[3]V-7 is a polypropyleneoxy-polyethyleneoxy triol of OH E.W. = 1674 supplied by BASF Wyandotte Chem. Corp., Wyandotte, Mich.
[4]DABCO 33LV is a 33 weight percent solution of triethylenediamine dissolved in dipropylene glycol and is supplied by Air Products Corp., Allentown, Penna.

Example 4

Using the procedure and apparatus described in Example 1 and the ingredients in the proportions by

TABLE IV

| Plaque | O | P | Q | R | S |
|---|---|---|---|---|---|
| Ingredients(pts. by. wt.) | | | | | |
| A component: | | | | | |
| Polyisocyanate I | 160.6 | 45.8 | 42.75 | 72.4 | — |
| Polyisocyanate II[1] | — | — | — | — | 91.1 |
| B component: | | | | | |

TABLE V

| Plaque | T | U | V | W | X | Y | Z |
|---|---|---|---|---|---|---|---|
| Ingredients (pts. by wt.) | | | | | | | |
| A component: | | | | | | | |
| Polyisocyanate I | 119.6 | 123.3 | 127 | 130.7 | 133.2 | 138 | 142 |
| B component: | | | | | | | |
| W-112 | 100 | 100 | 100 | 100 | 100 | 100 | 100 |
| DETDA | 5.0 | 5.0 | 5.0 | 5.0 | 5.0 | 5.0 | 5.0 |
| Ethylene glycol | 23.25 | 23.25 | 23.25 | 23.25 | 23.25 | 23.25 | 23.25 |
| Dibutyltin dilaurate | 0.1 | 0.1 | 0.1 | 0.1 | 0.1 | 0.1 | 0.1 |
| NCO/OH index | 0.97 | 1.0 | 1.03 | 1.06 | 1.08 | 1.12 | 1.15 |
| Gel time (sec.) | 3.0 | 3.0 | 3.0 | 3.0 | 3.0 | 3.0 | 3.0 |
| Density, gm./cc. | 1.12 | 1.13 | 1.13 | 1.14 | 1.14 | 1.14 | 1.14 |
| Hardness, Shore D | 70 | 72 | 72 | 72 | 75 | 75 | 75 |
| Tensile, psi | 4850 | 5200 | 5100 | 6350 | 5900 | 5950 | 6000 |
| Elongation, % | 90 | 80 | 100 | 160 | 170 | 160 | 100 |
| Die C Tear, pli | 960 | 920 | 1000 | 960 | 930 | 960 | 1070 |
| Heat sag, inches @ 325° F., 30 min. | 0.40 | 0.50 | 0.40 | 0.30 | 0.10 | 0.30 | 0.0 |
| Flexural modulus, psi | | | | | | | |
| −20° F. | 87,065 | 116,744 | 102,339 | 107,710 | 158,434 | 142,108 | 104,340 |
| 75° F. | 69,013 | 105,602 | 89,974 | 93,964 | 115,025 | 101,659 | 96,803 |
| 158° F. | 45,341 | 48,335 | 46,660 | 51,680 | 46,959 | 70,558 | 56,657 |
| Notched Izod ft.-lbs./in. | 7.6 | 8.7 | 8.4 | 11.1 | 7.7 | 6.6 | 6.0 |

TABLE IV-continued

| Plaque | O | P | Q | R | S |
|---|---|---|---|---|---|
| SF 6503 | 100 | 100 | — | 76.48 | 76.48 |
| V-7 | — | — | 100 | — | — |
| TIPMDA[2] | 23 | 50 | 43.5 | 11.72 | 11.72 |
| Ethylene glycol | 29 | — | — | 11.75 | 11.75 |
| UL-28 | 0.15 | 0.15 | 0.65 | 0.034 | 0.035 |
| NCO/OH Index | 1.04 | 1.04 | 1.04 | 1.05 | 1.04 |
| Mold temp. (°F.) | 155 | 104 | 155 | — | — |
| A/B Temp. (°F.) | 96/120 | 87/85 | 97/117 | — | — |
| Gel time (sec.) | 4 | 5 | 3 | 3.5 | 4.0 |
| Demold time (min.) | 1 | 0.2 | 1 | — | — |
| Post cure °F./min. | 250/60 | 250/60 | 250/60 | — | — |
| Density, gm./cc. | — | — | — | 1.08 | 1.09 |
| Hardness Shore D | 73D | 58D | 54D | 62D | 64D |
| Tensile str., psi | 5350 | 3000 | 3800 | 4100 | 4150 |
| Tensile modulus, psi | | | | | |
| 50% | 5300 | — | 1600 | — | — |
| 100% | — | 2050 | 1750 | 2950 | 3075 |
| 200% | — | 2850 | 2200 | 4100 | — |
| Die C tear, pli | 620 | 580 | 640 | 600 | 680 |
| Flexural modulus, psi | | | | | |
| −20° F. | 177,285 | — | — | 99,974 | 152,874 |
| 75° F. | 88,988 | — | — | 33,868 | 28,330 |
| 158° F. | 50,338 | — | — | 16,538 | 8,897 |
| Heat sag inches after 250° F./60 mins. | 0.0 | 0.0 | 0.0 | 0.20 | 0.70 |

Footnotes to Table IV
[1] Polyisocyanate II is a liquid isocyanate prepolymer prepared from 4,4′-methylenebis(phenylisocyanate) and a mixture of a minor amount of dipropylene and tripropylene glycol, I.E. = 180.
[2] TIPMDA is an abbreviation of the chemical 3,3′,5,5′-tetraisopropyl-4,4′-diaminodiphenylmethane.

EXAMPLE 5

Using the procedure and apparatus described in Example 1 and the ingredients in the proportions by weight set forth in Table V, there were prepared the polyurethane-polyureas T through Z in accordance with the present invention. The component and mold temperatures along with demold time and post cure treatment were as described in previous examples.

The samples varied in isocyanate to hydroxyl index from 0.97 to 1.15 and the excellent physical properties, particularly hardness, tear strength, modulus properties, and impact strength are maintained over a broad index.

EXAMPLE 6

Using the procedure and apparatus described in Example 1 and the ingredients in the proportions by weight set forth in Table VI, there were prepared the polyurethane-polyureas 1 and 2 in accordance with the present invention. The component and mold temperatures along with demold time and post cure treatment were as described in previous examples.

Sample 1 employed an extender mixture of 1,4-butanediol and the DETDA in the proportions by weight of 60 and 40 percent respectively. Sample 2, on the other hand, was comprised of 69 percent and 31 percent of ethylene glycol and the DETDA respectively.

Excellent tear strength, modulus properties and hardness, even at the high NCO/OH index of 1.35, were maintained in sample 1. The use of the isocyanate prepolymer in sample 2 lead to improved elongation and modulus properties with some loss in the heat sag property.

TABLE VI

| Plaque | 1 | 2 |
|---|---|---|
| Ingredients (pts. by wt.) | | |
| A Component: | | |
| Polyisocyanate I | 134.8 | — |
| Polyisocyanate II | — | 209.2 |
| B Component: | | |
| W-112 | 100 | — |
| SF-6503 | — | 100 |
| DETDA | 14.35 | 12.62 |
| 1,4-butanediol | 21.7 | — |
| Ethylene glycol | — | 28.08 |
| Dibutyltin dilaurate | 0.10 | — |
| UL-28 | — | 0.12 |
| NCO/OH Index | 1.35 | 1.04 |
| Gel time (sec.) | 2.5 | 3.3 |
| Density, gm./cc. | 1.12 | 1.19 |
| Hardness, Shore D | 72 | 76 |
| Tensile, psi | 5600 | 4990 |
| Elongation, % | 110 | 170 |
| Die C Tear, pli | 980 | — |
| Heat sag, inches @ 325° F./30 min. | 0.9 | 1.68 |

TABLE VI-continued

| Plaque | 1 | 2 |
| --- | --- | --- |
| Flexural modulus, psi | | |
| −20° F. | 122,125 | — |
| 75° F. | 79,319 | 148,770 |
| 158° F. | 38,879 | — |
| Notched Izod ft. lb./in. | 6.4 | — |

We claim:

1. In an elastomeric polyurethane-polyurea polymer prepared by the catalyzed reaction of an organic polyisocyanate, a polyol and an extender mixture comprising an aromatic polyamine and a low molecular weight diol the improvement which comprises employing in said reaction, with said organic polyisocyanate A. a polyol having a primary hydroxyl functionality of from about 2 to about 4 and a molecular weight of from about 1500 to about 12,000, and B. an extender mixture comprising,
   (i) an aromatic diamine wherein at least one of the positions ortho to each amine group of said diamine is substituted by a lower alkyl group, and
   (ii) a low molecular weight diol provided that said aromatic diamine comprises from about 5 to about 45 percent by weight of said extender mixture with the balance of from about 55 to about 95 percent by weight comprising the diol extender, and wherein the equivalent proportions of said polyol (A) to said extender mixture (B) is within the range of about 1:4 to about 1:50, and the ratio of isocyanate equivalents to the total active hydrogen equivalents of said polyol, said aromatic diamine, and said diol is from about 0.85 to about 1.35.

2. An elastomer according to claim 1 wherein said polyisocyanate is an aromatic polyisocyanate which is essentially difunctional.

3. An elastomer according to claim 1 wherein all of the positions ortho to each amine group of said diamine are substituted by an alkyl group.

4. An elastomer according to claim 3 wherein said diamine is selected from the group consisting of 1-methyl-3,5-diethyl-2,4-diaminobenzene, 1-methyl-3,5-diethyl-2,6-diaminobenzene, and mixtures thereof.

5. An elastomer according to claim 3 wherein said diamine is 3,3',5,5'-tetraisopropyl-4,4'-diaminodiphenylmethane.

6. In an elastomeric polyurethane-polyurea polymer prepared by the catalyzed reaction of an aromatic polyisocyanate which is essentially difunctional, a polyol, and an extender mixture comprising an aromatic polyamine and a low molecular weight diol the improvement which comprises employing in said reaction with said polyisocyanate, A. a polyol, having a primary hydroxyl functionality of from about 2 to about 4 and a molecular weight of from about 1500 to about 12,000, and B. an extender mixture comprising,
   (i) an aromatic diamine wherein all of the positions ortho to each amine group of said diamine are substituted by a lower alkyl group, and
   (ii) a low molecular weight diol provided that said aromatic diamine comprises from about 5 to about 45 percent by weight of said extender mixture with the balance of from about 55 to about 95 percent by weight comprising the diol extender, and wherein the equivalent proportions of said polyol (A) to said extender mixture (B) is within the range of about 1:4 to about 1:50, and the ratio of isocyanate equivalents to the total active hydrogen equivalents of said polyol, said aromatic diamine, and said diol is from about 0.85 to about 1.35.

7. An elastomer according to claim 6 wherein said aromatic diamine is a mixture comprising about 80 percent by weight of 1-methyl-3,5-diethyl-2,4-diaminobenzene and 20 percent by weight of 1-methyl-3,5-diethyl-2,6-diaminobenzene.

8. An elastomer according to claim 6 wherein the aromatic polyisocyanate is a liquid carbodiimide-containing methylenebis(phenyl isocyanate) having an isocyanate equivalent weight of from about 130 to about 180.

9. An elastomer according to claim 6 wherein the polyol component has a primary hydroxyl functionality of from about 2 to about 3 and falls within a molecular weight range of from about 2000 to about 8000.

10. An elastomeric polyurethane-polyurea prepared by the reaction of

A. a carbodiimide-containing methylenebis(phenyl isocyanate) having an isocyanate equivalent weight of from about 130 to about 180;

B. a polyol having a primary hydroxyl functionality of about 3 and a molecular weight of from about 2000 to about 8000;

C. an extender mixture comprising,
   (i) an 80/20 percent by weight mixture of 1-methyl-3,5-diethyl-2,4-diamino-benzene and 1-methyl-3,5-diethyl-2,6-diaminobenzene, and
   (ii) of ethylene glycol provided that said diamine mixture (i) comprises from about 5 to about 45 percent by weight of said extender mixture with the balance of from about 55 to about 95 percent comprising ethylene glycol, and D. A catalyst for the isocyanate-hydroxyl reaction; wherein the equivalent proportions of said polyol (B) to said extender mixture (C) is within the range of about 1:4 to about 1:50, and the ratio of isocyanate equivalents to the total active hydrogen equivalents of said polyol, said diamine mixture, and said ethylene glycol is from about 0.85 to about 1.35.

11. An article molded from an elastomeric polyurethane-polyurea according to claim 1.

* * * * *